(No Model.)

J. T. HARGER.
FLUID PRESSURE REGULATOR.

No. 598,148. Patented Feb. 1, 1898.

Witnesses
Wm. J. Hemming
Wm. Lumley

Inventor
J. T. Harger
by Elliott & Hopkins Att'ys

UNITED STATES PATENT OFFICE.

JAY THOMAS HARGER, OF CHICAGO, ILLINOIS.

FLUID-PRESSURE REGULATOR.

SPECIFICATION forming part of Letters Patent No. 598,148, dated February 1, 1898.

Application filed December 28, 1896. Serial No. 617,163. (No model.)

*To all whom it may concern:*

Be it known that I, JAY THOMAS HARGER, a citizen of the United States, residing at Chicago, in the county of Cook and State of Illinois, have invented certain new and useful Improvements in Gas Regulators or Governors, of which the following is a full, clear, and exact specification.

This invention relates to devices for regulating the supply or pressure of the gas in the service-pipes, which are usually situated between the supply-pipe or main and the burners, the supply branch thereof being connected with the meter, where one is used, and the other or outlet branch with the service-pipe which leads to the burner or burners. In devices of this nature the flow of gas through the regulator is usually controlled or governed by a valve suspended from a float situated in a chamber of mercury or other suitable fluid or suspended by any other delicate mechanism that will readily respond to the fluctuations in the gas-pressure thereon, thus closing the valve to a greater or less extent with an increase of pressure and permitting it to open more or less with a decrease of pressure, and owing to the liability of this mechanism to get out of order and permit the gas to leak it is desirable to so couple up the regulator with the meter and service-pipe that the regulator may be entirely shut off when desired without disconnecting the service-pipe from the main via the meter, whereby the necessary repairs may be made in the regulator or governor without interrupting the supply to the service-pipe.

My invention has for its primary object, therefore, to provide improved and simple means whereby the governor or regulator may be connected with the service-pipe and meter or main and to have the governor or regulator of such construction that the gas may pass therethrough directly to the service-pipe or may be compelled to pass the regulating-valve on its way to the service-pipe, as desired.

A further object of my invention is to improve and simplify the construction of a regulator of the described character whereby its parts may be readily disconnected and as readily put together when desired for repairs, examination, &c.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 1:
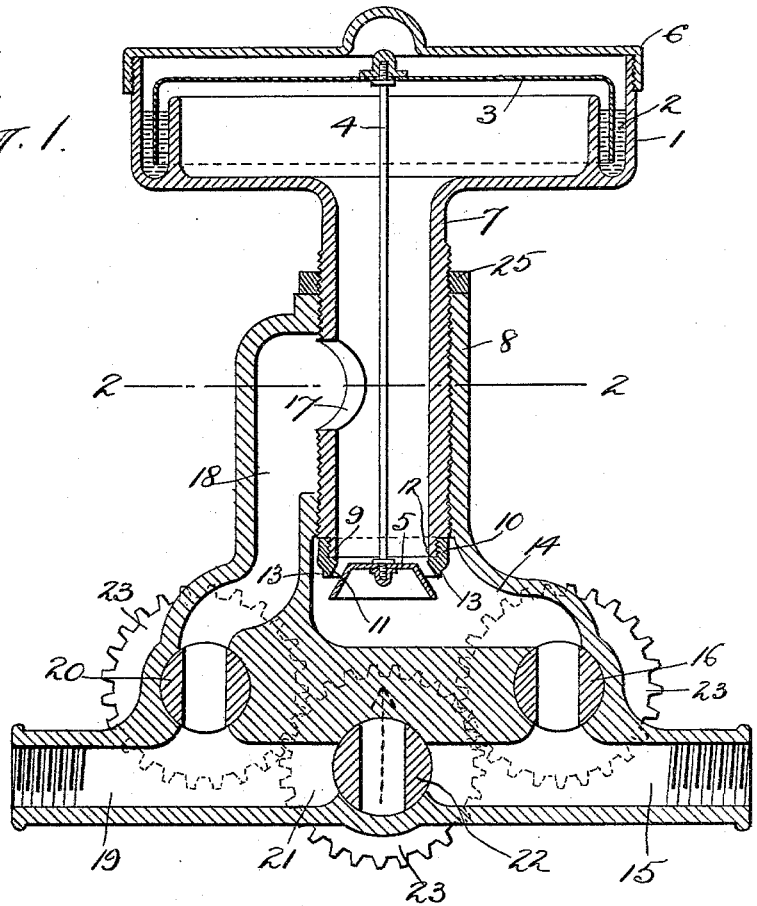
Figure 2:
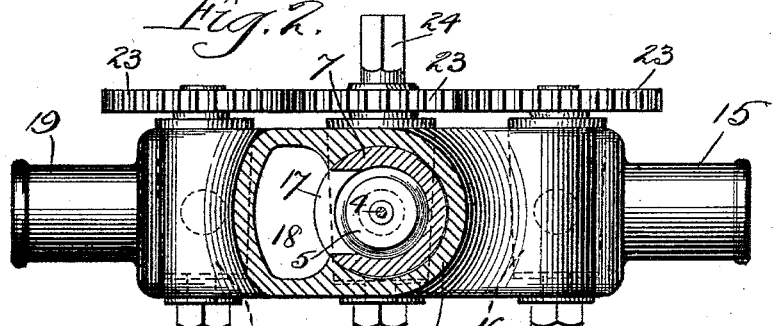

In the said drawings, Figure 1 is a vertical sectional view of my improved regulator or governor, taken lengthwise of the inlet and outlet branches thereof; and Fig. 2 is a plan section taken on the line 2 2, Fig. 1.

1 represents an annular chamber containing mercury 2 or any other suitable liquid and in which mercury is floated, the diaphragm or float 3 supporting the valve-stem 4 and valve 5 in the ordinary or any suitable manner, the chamber 1 being closed by screw-cap 6, if desired. Depending from the chamber 1 is a neck 7, which is screw-threaded on its exterior and screwed into a barrel 8. The lower end of the neck 7 is of considerably-reduced diameter, as shown at 9, and the exterior of this portion 9 is also screw-threaded and embraced by an annular screw-threaded flange 10, which is of less diameter than the major diameter of the neck 7, so that the flange 10 may pass through the barrel 8 without being obstructed by the threads in the latter. On the lower end or edge of the flange 10 is formed the valve-seat 11, with which the valve 5 contacts and which is provided with a shoulder 12, abutting against the end of the portion 9, as clearly shown in Fig. 1. The sides of the flange 10 are flattened, as shown at 13, to afford means for the application of a wrench, whereby the valve-seat may be readily removed when desired.

The lower end of the barrel 8 communicates via passage 14 with the inlet branch 15, which latter may be connected to the main or to the meter where one is employed, and located between the passage 14 and branch 15 is a cock 16, adapted to close communication between such passages. The side of the neck 7 above the valve-seat 11 is provided with an outlet-passage 17, and formed in the side of the barrel 8 opposite said outlet-passage 17 is a downwardly-extending passage 18, which communicates with the outlet branch 19, to which the service-pipe may be connected. Located between the passage 18 and branch 19 is a cock 20, similar to the cock 16, adapted to close communication between such passage 18 and branch 19 when desired. The inlet and outlet branches 15 19 are also connected together by a passage 21, whereby the gas may pass directly from the branch 15 into the branch 19 and enter the service-pipe without having gone through the regulating-valve. This passage 21 is also provided with a cock 22, which is adapted to close communication between the branches 15 19 when desired. Thus it will be seen that should it be desired to cut out the governor or regulator for any reason the cocks 16 20 may be turned across their passages and the passage 21 opened through the cock 22. In order that these movements of the cocks may be produced simultaneously and with accuracy and despatch, I provide the stems of the cocks with intermeshing gear wheels or pinions 23, one on each stem, as shown in Fig. 1, and one of the stems, preferably the stem of the cock 22, is provided with a key-post 24, whereby a quarter-turn of such post 24 will simultaneously open or close all of the cocks the desired extent.

The neck 7, if desired, may be provided with a jam-nut 25 threaded thereon and taking its abutment against the upper end of the barrel 8, and thus firmly locking the neck 7 in the desired position and preventing unauthorized persons from injuriously tampering with the apparatus.

I am aware that it was old prior to my invention to employ in connection with gas-regulators a system of passages and cocks whereby the gas was caused to flow through the regulator before entering the service-pipe, and, when desired, compelled to pass directly from the main to the service-pipe without going into the regulator at all, and I do not wish to be understood as broadly claiming such construction, the object of my invention being to improve and simplify a gas-regulator of this character whereby it is rendered more compact, durable, effective, less liable to get out of order, more easily understood by the unenlightened plumber, and capable of being readily taken apart by inexperienced persons when it is desired to make repairs or inspection of its members.

Having thus described my invention, what I claim as new, and desire to secure by Letters Patent, is—

A gas-regulator having in combination the barrel 8; the inlet branch 15; the threaded neck 7 screwed into said barrel; the passage 14 connecting said neck with said branch; the valve for closing the lower end of said neck; means for regulating said valve; the passage 18 formed in one side of said barrel, said neck being provided with the side opening 17 communicating with the passage 18; the outlet branch 19 communicating with the passage 18; the passage 21 connecting the branches 15 19 directly together; the cock 16 located between the branch 15 and passage 14; the cock 20 located between the branch 19 and passage 18 and the cock 22 located in the passage 21, substantially as and for the purpose set forth.

JAY THOMAS HARGER.

Witnesses:
F. A. HOPKINS,
WM. A. CUNNINGHAM.